United States Patent

Hall

[15] 3,646,263

[45] Feb. 29, 1972

[54] SEMIAUTOMATIC TELEVISION TRACKING SYSTEM

[72] Inventor: Kilmer L. Hall, Decatur, Ala.

[73] Assignee: The United States of America as represented by the Secretary of the Army

[22] Filed: Jan. 4, 1971

[21] Appl. No.: 103,549

[52] U.S. Cl. ....................................178/6.8, 178/DIG. 21

[51] Int. Cl. ....................................................H04n 7/18

[58] Field of Search...............178/DIG. 21, 6.8; 250/203 CT; 343/6 TV

[56] References Cited

UNITED STATES PATENTS 3,257,505 6/1966 Van Wechel ...................178/DIG. 21

2,970,187 1/1961 Hinton.............................250/203 CT

*Primary Examiner*—Robert L. Griffin

*Assistant Examiner*—Richard K. Eckert, Jr.

*Attorney*—Harry M. Saragovitz, Edward J. Kelly, Herbert Berl and Aubrey J. Dunn

[57] ABSTRACT

Movable crosshairs on a television monitor are controlled by a circuit responsive to manual control, and a television camera is controlled by a circuit responsive to the same manual control. The crosshairs are centered on a contrasting target in the field-of-view of the television system in response to the manual control. The system is then switched to an automatic mode of operation, and moves the crosshairs and the camera to keep the crosshairs on the target, and the target centered in the field-of-view. A hardstick providing outputs directly related to the pressure applied thereto is the manual control.

3 Claims, 1 Drawing Figure

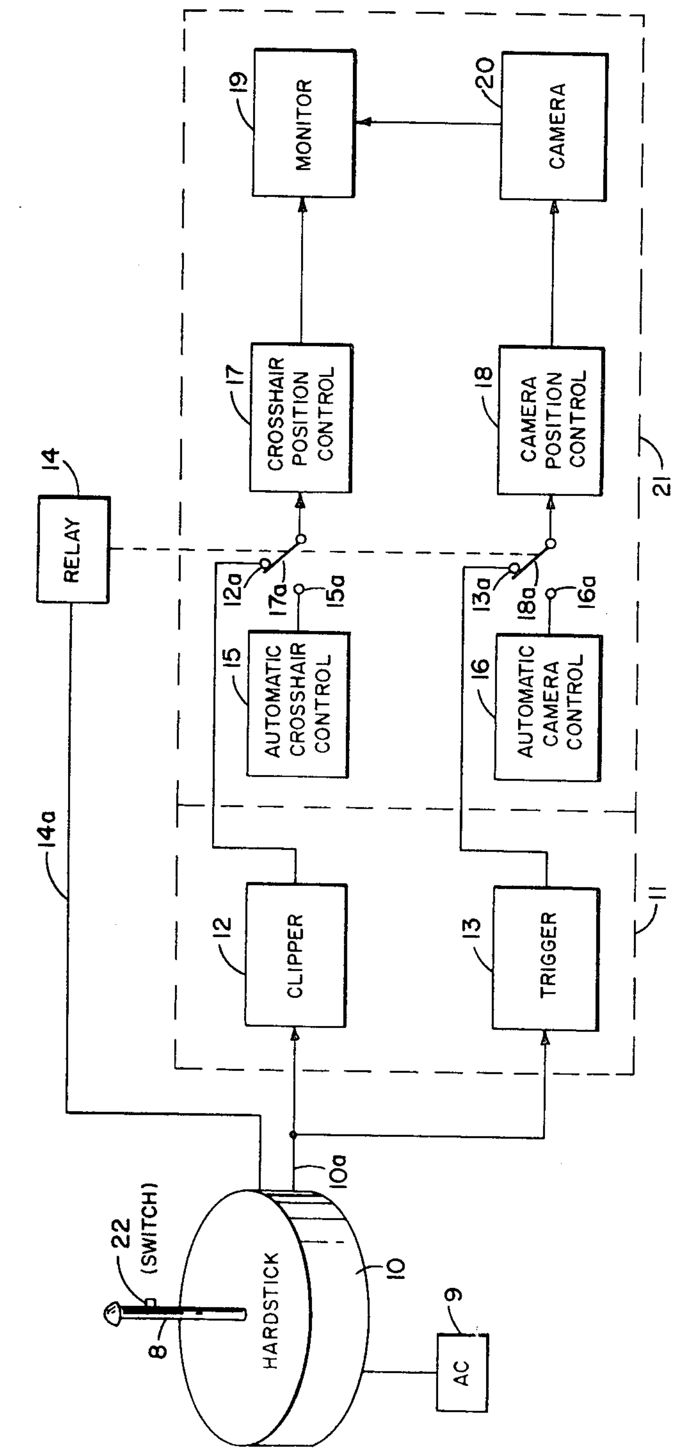
Kilmer L. Hall,
INVENTOR.
BY Harry M. Saragovitz
Edward J. Kelly
Herbert Berl
Aubrey J. Dunn

SEMIAUTOMATIC TELEVISION TRACKING SYSTEM

DEDICATORY CLAUSE

The invention described herein may be manufactured, used, and licensed by or for the Government for governmental purposes without the payment to me of any royalty thereon.

CROSS-REFERENCE TO RELATED APPLICATION

The instant invention may be used to advantage in copending U.S. Pat. application Ser. No. 815,517, filed Apr. 7, 1969, of common assignee.

BACKGROUND OF THE INVENTION

This invention is in the field of television target tracking systems. Known examples of such systems are those shown in U.S. Pat. Nos. 3,257,505 and 3,507,991. These patents were respectively issued June 21, 1966 and Apr. 21, 1970.

SUMMARY OF THE INVENTION

A television tracking system is provided in which a novel manual means controls the system. Specifically, a hardstick controls both the movement of crosshairs on the television field-of-view, and the direction of the line-of-sight of the television camera. For pressures on the hardstick below a certain level, only the crosshairs move, but for pressures above the certain level, both the crosshairs and the camera move. The invention includes a means for locking the system into automatic operation, once a target is acquired.

BRIEF DESCRIPTION OF THE DRAWING

The single drawing FIGURE shows a schematic diagram of the invention.

DETAILED DESCRIPTION OF THE PREFERRED EMBODIMENT

Referring to the drawing, reference numeral 10 designates a hardstick controller. This controller is fed by AC source 9 and normally has two DC outputs, one for each of two rectangular coordinate axes. The hardstick includes rectifying and filtering means. The outputs have amplitudes and polarities dependent on the direction and amount of pressure applied thereto. In order to simplify the description of the invention, only one output, **10*a*, is shown. This output may control panning or tilting of the television camera, as desired. The output on 10*a* is a voltage directly related to pressure on stick 8, along one rectangular coordinate axis. This voltage is applied to signal processor 11. This processor includes clipper 12 and trigger 13. Clipper 12 passes the output of 10*a* freely until a level V is reached, and then limits at V. Trigger 13 has no output until V is reached, then directly follows the output on 10*a*. The outputs from 12 and 13 are applied respectively to terminals 12*a* and 13*a*. Terminals 12*a* and 13*a* are fixed contacts of relay 14. The relay additionally has fixed contacts 15*a* and 16*a* respectively connected to elements 15 and 16, and movable contacts 17*a* and 18*a* connected to elements 17 and 18. The elements 15, 16, 17 and 18, as well as monitor 19 and camera 30, are well known in the art and find their equivalents in the system as taught by Van Wechel in U.S. Pat. No. 3,257,505, referred to above. Instant dotted-line rectangle 21, with the exception of the relay contacts, is similar in function to FIG. 1 of the Van Wechel patent. Relay 14 is controlled along line 14*a* from switch 22 mounted on stick 8. This switch may be fed power from source 9, and may be of an on-off type, or a normally open pushbutton type. If the latter type is used, the relay may be a ratcheting type, or a J-K flip-flop with its inputs tied together may be interposed in line 14*a***.

Operation of the system is simple. With switch 22 in a position for manual control, an operator (not shown) observes monitor 19 until he sees a target, then applies pressure to stick 8 to center the crosshairs of his monitor on the target. As he applies slight pressure to the stick, the output of 10 is such that only the crosshairs move, because of trigger 13. If the operator applies more pressure to the stick, camera 20 will move, from operation of trigger 13 (naturally, the hairlines also move). The output of 17 may be limited so that the hairlines do not move too far from the center of monitor 19; further movement of the hairlines toward a target must result from movement of the camera. Once an operator has the target under the hairlines, he may switch to an automatic mode of operation, by operating switch 22. If no target was visible on monitor 19 in the manual mode, the operator may move camera 20 with hardstick 10, to search for a target.

Hardstick 10 may take any one of several forms, such as the Model 435 Hand Control, manufactured by Measurement System, Inc., 140 Water Street, South Norwalk, Conn. This particular control includes rectifiers and filters and provides proper DC output signals. Trigger 13 may take the form of two series-opposed Zener diodes, or two parallel connected chains of conventional diodes. While the word "crosshairs" has been used, it should be understood that the term "tracking gate" as used in the cited Van Wechel patent is as applicable. FIG. 1 of Van Wechel may be readily adapted for manual use with the present invention by substituting the output of instant element 12 for "manual control arrangement 119" and the output of instant element 13 for the output of "low-pass filter 106." Obviously, a duplicate of instant element 12 would be required to replace "manual control arrangement 138." Also, a duplicate of instant element 13 would need to be substituted for the output of "low-pass filter 124" of Van Wechel. A duplicate of instant element 14 would be necessary for duplicate elements 12 and 13. The (not shown) duplicate elements 12 and 13 would be connected to the other output (not shown) of hardstick 10. Obviously, a relay having four sets of contacts could be substituted for relay 14 and its duplicate. Alternatively, relay 14 (and/or its duplicate) could be replaced by a plurality of transistors or controlled rectifiers.

I claim:

1. A television tracking system including a television camera, means for panning and tilting said camera, a television monitor fed by said camera, first means for causing a certain portion of the field-of-view of said monitor to track a contrasting object in said field-of-view, and second means for causing said means for panning and tilting to move said camera to maintain said certain portion of said field-of-view centered on said monitor, the improvement comprising: a manually operable hardstick having output signals directly related to the pressure applied to said hardstick; means responsive to said output signals for providing, at a first terminal, first signals directly related to said output signals up to a certain amplitude, and thereafter maintaining said first signals at said certain amplitude until said output signals drop below said certain amplitude, and providing, at a second terminal, second signals directly related to said output signals only when said output signals equal or exceed said certain amplitude; switching means for disconnecting said first means for causing from said monitor and connecting said first terminal thereto and for disconnecting said second means for causing from said means for panning and tilting and connecting thereto said second terminal.

2. The system as set forth in claim 1 wherein said switching means includes a relay having a coil and having contacts connected to said first and second means for causing, to said first and second terminals, to said monitor, and to said means for panning and tilting, and further includes a relay power source, and a manually operable switch mounted on said hardstick for connecting said power source to said coil of said relay.

3. The system as set forth in claim 2 wherein said means responsive includes a clipping circuit having its output connected to said first terminal, and a trigger circuit having its output connected to said second terminal.

* * * * *